Dec. 28, 1926.
T. D. FINIZIO
BUMPER FOR MOTOR VEHICLES
Filed April 27, 1926
1,612,425
2 Sheets-Sheet 1
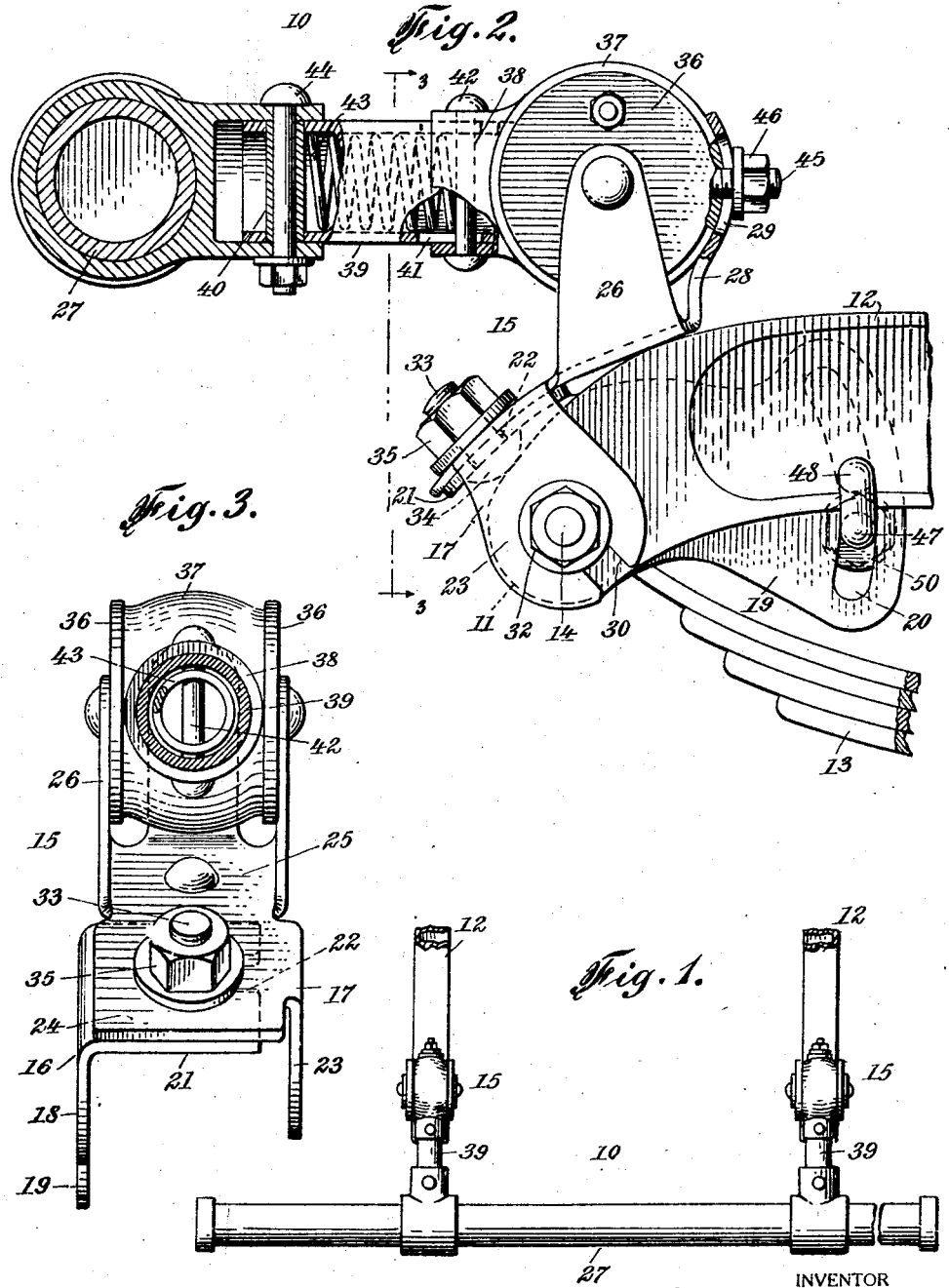
INVENTOR
Thomas D. Finizio
BY
Conrad A. Dieterich
his ATTORNEY Dec. 28, 1926.  
T. D. FINIZIO  
1,612,425  
BUMPER FOR MOTOR VEHICLES  
Filed April 27, 1926   2 Sheets-Sheet 2
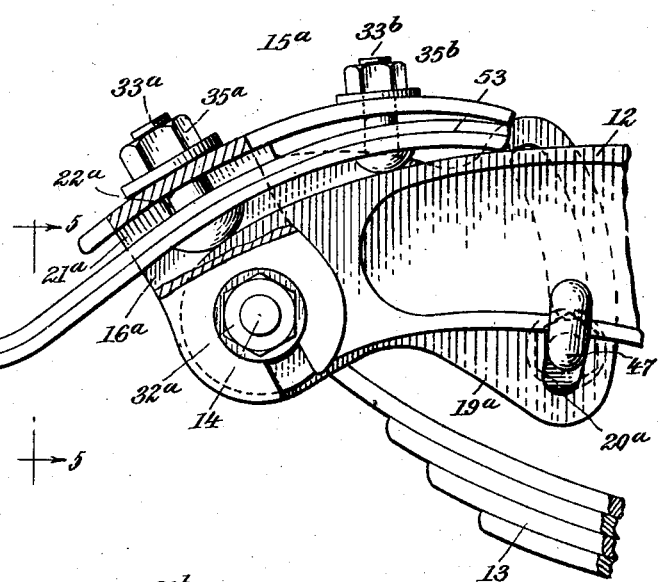
Fig. 4.
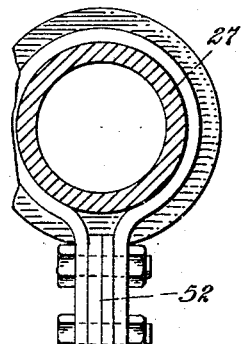
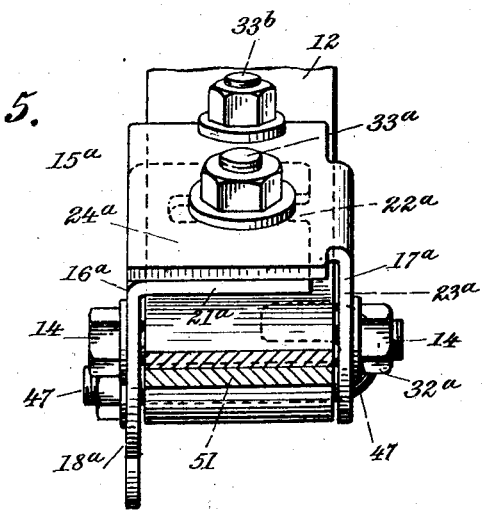
Fig. 5.
INVENTOR  
Thomas D. Finizio  
BY  
Conrad A. Dieterich  
his ATTORNEY Patented Dec. 28, 1926.

1,612,425

UNITED STATES PATENT OFFICE.

THOMAS D. FINIZIO, OF PEEKSKILL, NEW YORK.

BUMPER FOR MOTOR VEHICLES.

Application filed April 27, 1926. Serial No. 104,995.

My invention relates to improvements in means for protecting motor vehicles from injury due to collision or contact with other bodies or objects, and the same has for its object more particularly to provide a simple, efficient and inexpensive device which may be readily attached to a motor vehicle.

Further, said invention has for its object to provide a bumper for motor vehicles which is adjustable to desired position, and which may be readily fitted upon and secured to motor vehicle frames of different forms.

Further, said invention has for its object to provide a bumper for motor vehicles in which the means for securing the same to the ends of the side frame members of the vehicle may in part be secured firmly in position to said side frame members by the shackle bolts which serve to secure the forward ends of the vehicle springs thereto.

Further, said invention has for its object to provide a bumper for motor vehicles in which the means for securing the same is readily adjustable in order to render the bumper securable, without structural change, to different makes of vehicles.

Further, said invention has for its object to provide a bumper for motor vehicles in which the means for securing the same to each frame member of the vehicle is essentially composed of a plurality of cooperating parts which are adjustable relative to each other in order to receive therebetween side frame members of different widths or sizes.

Further, said invention has for its object to provide a bumper for motor vehicles in which the attaching member for supporting and securing the bumper bar in place is so constructed and arranged that any impact or shock received by the bumper bar will be transmitted to the supporting member and resisted essentially by the side frame member upon which said attaching member rests, in order to relieve the shackle bolt of undue strain as far as possible.

Other objects will in part be obvious and in part be pointed out hereinafter.

To the attainment of the aforesaid objects and ends, my invention consists in the novel features of construction, and in the combination, connection and arrangement of parts hereinafter more fully described and then pointed out in the claims.

In the accompanying drawings forming part of this specification—

Figure 1 is a plan showing one form of bumper constructed according to and embodying my said invention;

Fig. 2 is an enlarged side elevation of the bumper bar supporting device;

Fig. 3 is a front view thereof;

Fig. 4 is a side view of a modification; and

Fig. 5 is a front view thereof.

Referring to the drawings (Figs. 1 to 3) I have illustrated the bumper 10 embodying my said invention applied to the forward ends 11 of the side frame members 12 of the chassis of a motor vehicle or the like. The frame members 12, as usually constructed, are channel-shape in cross section, and the forward ends 11 thereof curve downwardly slightly to form the "goose necks". The usual vehicle springs 13 are secured at their front ends to the forward ends of the side frame members by means of the shackle bolts 14.

In my invention the bumper 10 is secured upon the ends 11 of the side frame members 12 by means of the attaching devices 15. Each attaching device 15 comprises a pair of cooperating clamping members 16 and 17 which are relatively adjustable transversely to permit of the same being applied to frame members of different widths and to the frame members of vehicles of various makes and which, when placed in position upon the frame member 12 are held thereon firmly in engagement therewith.

The clamping member 16 includes a vertical side portion 18 having an extension 19 at the rear thereof provided with a vertically disposed arcuate slot 20, and includes an inwardly directed horizontal portion 21 with a transverse slot 22 therein open at one end.

The clamping member 17 includes a vertical side portion 23 and an inwardly directed horizontal portion 24 having an extension 25 at the rear thereof provided at the sides with the upwardly directed ears 26 for adjustably supporting the bumper bar 27, as hereinafter more fully described, and at the rear with the upwardly directed tongue 28 having a vertical slot 29 therein.

The clamping member 16, including the portions 18, 19 and 21, and the clamping member 17, including the portions 23, 24, 25, 26 and 28, are preferably each formed of one piece of material or integrally; sheet metal, which may be suitably stamped out and shaped to form, being preferably employed in the construction of said members 16 and 17.

The side portions 18 and 23 are provided with openings therein for receiving the opposite ends of the shackle bolt 14, said openings preferably consisting of vertical slots 30 open at their lower ends to form bifurcations.

In attaching the members 16 and 17 in position upon the frame member 12, the side portions 18 and 23 are disposed upon the opposite sides of the frame members 12 with the slots 30 engaging the opposite ends of the shackle bolt 14, and the portions 21 and 24 are disposed in overlapping relation intermediate said side portions 18 and 23 directly upon the top of said frame member 12. The members 16 and 17 are then adjusted to adapt the same to the width of the frame member on which the same are disposed by forcing the side portions 18 and 23 firmly in engagement with the sides of the frame member 12, and the same are then secured by means of the nuts and washers 32 upon the ends of the shackle bolt. After the members 16 and 17 have been adjusted to conform to the width of said frame member 12, the intermediate overlapping portions 21 and 24 are secured together by means of the bolt 33 having a head 34 in engagement with the inner side of the portion 21, and passing through the slot 22 therein and through a suitable opening in the upper portion 24. The portions 21 and 24 are clamped together by means of the nut 35 (and washer) threaded upon the outer end of said bolt 33.

In the particular embodiment of my invention shown at Figs. 1 to 3 the bumper bar 27 is adjustably supported in the circular bearing members 36 secured to the inner sides of the ears 26. For this purpose, a hollow cylindrical member or drum 37, rotatably disposed between said bearing members 36, has a forwardly extending tubular portion 38 in which is slidably disposed a tubular member 39 open at the rear end thereof. A hollow cylindrical pin 40 extends transversely through said tubular member 39 at the forward end thereof, and the rear end of said tubular member is provided with longitudinal slots 41 through which passes a suitable pin or bolt 42 secured to and extending transversely of the tubular portion 38. A coil spring 43 is disposed within the tubular member 39 between the members 40 and 42 serving as abutments therefor. The bumper bar 27 is secured to the outer ends of the members 39 by means of the bolts 44 passing through the hollow pins 40.

A suitable member, such as a bolt 45 secured to said rotatable member 37 projects rearwardly therefrom and traverses the slot 29 in the tongue 28. A suitable clamping member or nut 46 threaded upon the rear end of the member 45 is adapted to frictionally engage said tongue 28 to hold said rotatable member 36 with the bumper bar carried thereby in adjusted position.

The clamping device 15 is also adjustable vertically so that the same may be directly supported upon the frame member 12 instead of by the shackle bolt whereby to relieve the shackle bolt of undue strain. For this purpose when the device is being attached, the same is vertically adjusted or swung about the shackle bolt 14 as an axis so that the overlapping portions 21 and 24 rest evenly upon the frame member 12 and firmly in engagement therewith. After such adjustment the device 15 is maintained in position by a J-bolt 47 having its hooked end 48 engaging the inner flange of said frame member 12 and its threaded end passing through the vertical slot 20 in the extension 19 on which end 49 is threaded a nut 50.

In attaching each device 15 to its frame member 12 the members 16 and 17 are disposed upon the end of the frame member 12 in engagement with the shackle bolt, and are then relatively adjusted to adapt the same to the width of the frame member.

When the overlapping portions 21 and 24 firmly engage the top of the frame member 12, the nuts 35 and 50 are tightened to maintain the device in such position. The nuts 46 may then be actuated to permit of the adjustment of the elevation of the bumper bar 27, if such adjustment is found necessary. In operation the spring 43 maintains the bumper bar 27 in projected position, the forward movement of the bumper being limited by the engagement of the pin 42 with the inner ends of the slots 41. The bumper bar is thus yieldingly supported by the adjustable members 37.

At Figs. 4 and 5 is illustrated a modified form of clamping device 15ª for attaching a bumper bar 27 to the frame members 12 of a motor vehicle or the like. In this form the clamping member 16ª is substantially like the clamping member 16 shown at Figs. 1 to 3, and comprises the slotted vertical side portion 18ª, extension 19ª, slot 20ª and inwardly directed horizontal portion 21ª with the transverse slot 22ª therein. The member 17ª on the other hand partly resembles the corresponding member 17, shown at Figs. 1 to 3, since the former includes the slotted vertical side portion 23ª and the inwardly directed horizontal portion 24ª, and differs from said member 17 because in the modified embodiment of the invention the ears 26 and tongue 28 are eliminated.

The device 15ª, shown at Figs. 4 and 5, is particularly adapted for attaching to the vehicle frame members a bumper of the type including curved leaf springs 51 having the bumper bar 27 secured to the outer ends 52 thereof.

The inner end portion 53 of each leaf spring 51 is secured to the overlapping intermediate portions 21ª and 24ª of the clamping members at the lower side thereof by means of the bolt 33ª, corresponding to the bolt 33 at Figs. 1 to 3, which passes through the portions 21ª and 24ª and through the end portion 53 of said leaf spring 51, and by the bolt 33ᵇ, which bolts 33ª, 33ᵇ have the nuts 35ª, 35ᵇ thereon for securing the parts together. The inner portion 21ª has a slotted connection 22ª with said bolt 33ª, to permit of the relative transverse adjustment of said members 16ª, 17ª to adapt the same to the width of said frame member.

The members 16ª and 17ª are attached to the frame member 12 by engaging the side portions 18ª and 23ª with the shackle bolt 14 and securing said side portions by means of the securing devices 32ª in engagement with the sides of said frame member. The nuts 35ª are then tightened which draw the portions 21ª, 24ª, 53 together in clamped relation, the portion 53 being interposed between the lower of said overlapping portions 21ª, 24ª and the top of the frame member 12. The spring portion 53 and the overlapping portions 21ª, 24ª are held firmly in engagement with and upon the top of the frame member 12, for the purpose above described after the device 15ª is adjusted about the shackle bolt 14 as an axis, by securing the same by means of the J-bolt 47 in the manner shown at Figs. 1 to 3 and described above.

It is to be noted that the novel form of attaching means is readily applicable to bumpers of various forms, and that the adjustable arrangement of said attaching means permits of the easy and convenient conforming and securing thereof to different forms and sizes of side frame members.

Further, it is to be noted that as the several parts of the device are simple in construction and formed of sheet metal the same may be economically and easily assembled.

Having thus described my said invention, what I claim and desire to secure by Letters Patent is:

1. A device of the character described comprising a pair of adjustable members for securing a bumper to the frame member of a vehicle including side portions adapted to be engaged by the opposite ends of the shackle bolt of said frame member, and intermediate portions adapted to rest upon the end of said frame member, substantially as specified.

2. A device of the character described comprising a pair of overlapping members for securing a bumper to a vehicle frame member adapted to be supported upon and in engagement with said frame member, and side members extending therefrom adapted to receive therebetween the said frame member, substantially as specified.

3. A device of the character described comprising clamping members for securing a bumper in position upon a vehicle frame member including overlapping intermediate portions, and side portions depending from said intermediate portions; said clamping members embracing the top and sides of said frame member and conforming substantially thereto; and said clamping members being relatively adjustable to adapt the same to vehicle frame members of different widths, substantially as specified.

4. A device of the character described comprising a pair of clamping members for securing a bumper in position upon a vehicle frame member including side portions having openings therein adapted to receive the opposite ends of the shackle bolt of said frame member, and overlapping intermediate portions adapted to rest upon the end of said frame member, and means for securing said overlapping portions together in adjusted position upon said frame member, substantially as specified.

5. A device of the character described comprising a pair of clamping members for securing a bumper in position upon a vehicle frame member including bifurcated side portions adapted to engage the opposite ends of the shackle bolt of said frame member, and overlapping intermediate portions adapted to rest upon said frame member; substantially as specified.

6. A device of the character described comprising a pair of members for securing a bumper in position upon a vehicle frame member including slotted side portions adapted to engage the opposite ends of the shackle bolt of said frame member, and overlapping intermediate portions adapted to rest upon the end of said frame member, and means passing through said overlapping portions for securing the same together in adjusted position upon said frame member, substantially as specified.

7. A device of the character described comprising a pair of members for securing a bumper in position upon a vehicle frame member including side portions adapted to be engaged by the opposite ends of the shackle bolt of said frame member, and intermediate overlapping portions adapted to rest upon the end of said frame member, means for securing said overlapping portions together in adjusted position upon said frame member, and means for adjustably securing the rear of said device to said frame member whereby to maintain said intermediate overlapping portions duly in engagement with said frame member, substantially as specified.

8. A device of the character described comprising a pair of clamping members for securing a bumper in position upon a vehicle frame member including overlapping intermediate portions, and side portions depending from said intermediate portions; said clamping members embracing the top and sides of said frame member, and means for securing said overlapping portions together in adjusted position upon said frame member, substantially as specified.

9. A device of the character described comprising a pair of clamping members for securing a bumper in position upon a vehicle frame member including side portions having openings therein adapted to receive the opposite ends of the shackle bolt of said frame member, and overlapping intermediate portions adapted to rest upon the end of said frame member, substantially as specified.

10. A device of the character described comprising a pair of clamping members for securing a bumper in position upon a vehicle frame member including bifurcated side portions adapted to engage the opposite ends of the shackle bolt of said frame member, and overlapping intermediate portions adapted to rest upon the top of said frame member; said clamping members being relatively adjustable to adapt the same to vehicle frame members of different widths, a bolt passing through said overlapping portions for securing the same together in adjusted position upon said frame member, and means for adjustably securing the rear of said device to said frame member whereby to maintain said intermediate overlapping portions duly in engagement with said frame member, substantially as specified.

11. A device of the character described comprising a pair of clamping members adapted to be secured upon a vehicle frame member at the opposite sides thereof, and relatively adjustable to adapt the same to vehicle frame members of different widths, a member rotatably mounted upon one of said clamping members, a bumper bar carried by said rotatable member, and means on said rotatable member engaging a portion of the clamping member thereof for securing said rotatable member in adjusted position, substantially as specified.

12. A device of the character described comprising a pair of clamping members having side portions adapted to engage the sides of a vehicle frame member, and overlapping intermediate portions adapted to rest thereupon, a member rotatably mounted upon one of said overlapping portions, a bumper bar carried by said rotatable member, and means for securing said rotatable member in adjusted position, substantially as specified.

13. A device of the character described comprising a support including side portions adapted to engage the sides of a vehicle frame member and an intermediate portion adapted to rest thereupon, ears projecting upwardly from said intermediate portion, circular bearing members secured to said ears, a hollow cylindrical member rotatably disposed within said bearing members, a bumper bar yieldingly mounted upon said hollow member, and means for securing said hollow member in adjusted position, substantially as specified.

14. A device of the character described comprising a support including side portions adapted to engage the sides of a vehicle frame member and an intermediate portion adapted to rest thereupon, ears projecting upwardly from said intermediate portion, a member rotatably mounted between said ears, a bumper bar carried by said member, a slotted tongue projecting upwardly from said intermediate portion at the rear of said rotatable member, and a member carried by said rotatable member and traversing said slot, whereby to secure said rotatable member in adjusted position, substantially as specified.

15. A device of the character described comprising a pair of clamping members having slotted side portions adapted to engage the opposite ends of the shackle bolt of a vehicle frame member, and inwardly directed overlapping portions adapted to rest upon the top of said frame member, and relatively adjustable to adapt said clamping members to vehicle frame members of different widths, means passing through said overlapping portions for securing the same together in adjusted position on said frame member, means for adjustably securing said device at the rear thereof to said frame member whereby to maintain said overlapping portions duly in engagement with said frame member, ears projecting upwardly from the outer of said overlapping portions, a hollow drum rotatably mounted between said ears, a bumper bar yieldingly mounted upon said drum, a slotted tongue projecting upwardly from the outer of said overlapping portions at the rear of said drum, and a member carried by said drum and traversing said slot for securing said drum in adjusted position, substantially as specified.

Signed at the city of New York, in the county and State of New York, this 23d day of April, one thousand nine hundred and twenty-six.

THOMAS D. FINIZIO.